3,157,709
COMPOSITION COMPRISING A POLYESTER AND A MONOESTER OF A DIHYDROXY-SUBSTITUTED BENZOPHENONE
Paul E. Hoch, Youngstown, N.Y., and Richard J. Bellet, Mountain Lakes, N.J., assignors to Hooker Chemical Corporation, Niagara Falls, N.Y., a corporation of New York
No Drawing. Filed May 8, 1959, Ser. No. 811,811
6 Claims. (Cl. 260—861)

This invention relates to polymerizable light stabilizers or ultraviolet light screeners useful for imparting improved weathering characteristics to polymeric resins. This invention also relates to methods for making such stabilizers. The invention further relates to polymeric resins having such stabilizers incorporated therein.

In the weathering of light-stabilized plastic or polymer resins, the leaching out of conventional or prior art ultraviolet screeners from the surface of the resin decreases the amount of protection against ultraviolet rays and hence hastens the degradation of said resins.

It is one of the objects of this invention, therefore, to provide light stabilizers which will not leach out of the polymeric resins to which they are added thereby decreasing or preventing degradation of polymeric resins caused by such leaching out.

Also in the weathering of light-stabilized plastic or polymeric resins it has, with prior art stabilizers, been frequently impossible to incorporate the desired amount of light stabilizer in the resin without exceeding the solubility limit of the stabilizer in the resin, thereby impairing other physical properties of the resin, such as its heat distortion temperature or its color, etc.

It is therefore, a further object of this invention to discover and synthesize light stabilizers which are much more soluble in such resins than are prior art stabilizers.

We have found that these and other objects may be realized through the discovery and use of polymerizable light stabilizers in such resins. We have further found that polymerizable light stabilizers may be made by reacting together or esterifying a polyhydroxybenzophenone containing a hydroxyl group in the 2 position, with an unsaturated acidic compound to obtain a polymerizable ester which still possesses a hydroxyl group in the 2 position.

Such unsaturated acidic compounds may be found among the group consisting of acrylic acid, methacrylic acid, maleic acid, fumaric acid, itaconic acid, citraconic acid, crotonic acid, oleic acid, vinylsulfonic acid and the like.

Typical starting polyhydroxybenzophenones which contain a hydroxy group in the 2 position, and which may be reacted with an unsaturated acidic compound such as indicated above to obtain a polymerizable ester which still possesses a hydroxyl group in the 2 position are: 2,4-dihydroxybenzophenone; 2,2',4,4'-tetra-hydroxybenzophenone; 2,4-dichloro-2',4'-dihydroxybenzophenone; 2,4,4'-trihydroxybenzophenone; 2,2',4-trihydroxybenzophenone; 2,4-dihydroxy-4'-methylbenzophenone; 2,4-dihydroxy-4'-alkylbenzophenone; 2,4-dihydroxy-4'-methoxybenzophenone; etc.

The polymerizable screener thus obtained by reacting such an unsaturated acidic compound with such a 2-hydroxybenzophenone may be represented by the formula:

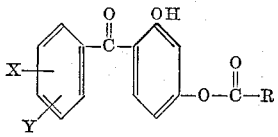

wherein R represents an unsaturated radical and wherein X and Y may be substituents in the 2, 3, 4, 5 and 6 positions when they are each selected from the group consisting of alkyl, halogen and hydrogen and wherein X and Y may be substituents in the 2, 4 and 6 positions when they are each selected from the group consisting of hydroxyl and alkoxyl.

The unsaturated radical R of screeners possessing the foregoing formula reacts with and forms a part of the polymer resin when mixed and reacted therewith. Problems of leaching out of and of exceeding the solubility are thereby automatically overcome.

Another advantage of the use of some of the polymerizable screeners of this invention is that a methacrylate based screener is especially useful in chlorine containing polymer resins, especially in preventing or interrupting polyene formation.

Typical polymers with which the light stabilizers of this invention may be used are polystyrene, polyvinyl chloride, polyethylene, polyesters employing hexahalocyclopentadiene, etc. The polymerizable screeners or stabilizers can also be used in the polymers used to make up lacquers for overcoating other polymers to increase their light stability.

The following examples will further illustrate the teachings of this invention.

Example 1.—The Preparation of 2-Hydroxy-4-Methacryloxy-Benzophenone 107 grams of 2,4-dihydroxy benzophenone was dissolved in 200 ml. pyridine and 52.3 grams methacroyl chloride. This was stirred at ambient for one hour, then poured into dilute HCl and ice. The initially formed oil slowly hardened. This was recrystallized from methanol to give 49.3 grams of pale yellow crystalline product, melting at 77.0–77.5 degrees centigrade.

Analysis.—Calc'd. for $C_{17}H_{14}O_4$: C, 72.35; H, 4.96. Found: C, 72.39; H, 4.94.

The following examples will serve to illustrate the use of stabilizers of the present invention and the improvements resulting therefrom.

In order to allow for consistent and uniform results so that comparisons could be made, the following procedure was used for evaluating weather resistance. One-ply polyester glass fiber laminates (Owens-Corning Fiberglas Corporation Mat No. 216B) containing about 30 percent by weight glass and about 70 percent by weight resin were exposed in Miami, Fla. These panels were exposed by the standard dry land method, that is, 45 degrees to the vertical facing south twenty-four hours/day.

Example 2.—Resin Preparation

An unsaturated polyester resin was prepared by esterifying about fiifty-three parts of ethylene glycol and ninety parts of diethylene glycol with about three hundred and ninety-five parts of 1,4,5,6,7,7-hexachlorobicyclo-(2.2.1)-5-heptene - 2,3 - dicarboxylic anhydride (which was prepared by the Diels-Alder reaction of hexachlorocyclopentadiene with maleic anhydride) and about seventy-one parts of maleic anhydride. About thirty parts of styrene and about one hundred parts of product produced by the esterification reaction were mixed tobether until complete solution was attained to give a clear, substantially colorless solution of liquid polyester resin having a viscosity of about thirty poises at twenty-five degrees centigrade on a Gardner bubble viscometer and having a chlorine content of about thirty percent by weight of the total.

Example 3

To one hundred parts of the unsaturated polyester resin prepared in Example 2 was added 1 part of 2-hydroxy-4-methacryloxybenzophenone. A glass laminate was prepared in accordance with the aforementioned method and the resulting mixture polymerized, in the presence of a catalyst consisting of about two percent by weight of a mixture containing fifty percent by weight of benzoyl peroxide in tricresyl phosphate, by heating to a temperature of about ninety-five degrees centigrade for about twenty minutes on an open bed hydraulic press and twelve hours at eighty degrees centigrade in a forced draft oven.

The laminate thereby obtained was exposed outdoors for three months in the manner described above in Miami, Fla., after which time the surface showed only slight discoloration and no surface erosion. A control prepared in the same manner but containing no light stabilizer showed marked discoloration and severe surface erosion.

Although this invention has been illustrated by citing specific details of given species embraced within the scope of the invention, it is to be understood that various modifications within the invention are possible, some of which have been referred to above; therefore, we do not wish to be limited except as defined by the appended claims.

We claim:

1. A composition of matter comprising (A) an unsaturated polyester resin having esterified therein the Diels-Alder reaction product of hexachlorocyclopentadiene and maleic anhydride, and (B) a compound having the formula:

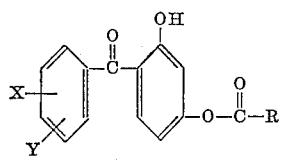

wherein R represents an unsaturated radical and wherein X and Y are each substituents selected from the group consisting of hydrogen, alkyl, halogen, hydroxyl and alkoxyl provided that hydroxyl and alkoxyl substituents can only occur in the 2,4 and 6 positions.

2. A composition of matter comprising (A) an unsaturated polyester resin which comprises the esterification product of a dihydric alcohol and the Diels-Alder reaction product of hexachlorocyclopentadiene and maleic anhydride, and (B) a compound having the formula:

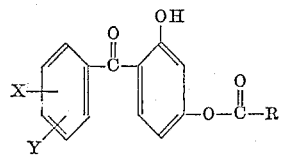

wherein R represents an unsaturated radical and wherein X and Y are each substituents selected from the group consisting of hydrogen, alkyl, halogen, hydroxyl and alkoxyl provided that hydroxyl and alkoxyl substituents can only occur in the 2,4 and 6 positions.

3. A composition according to claim 2 when polymerized with styrene.

4. A composition of matter comprising (A) an unsaturated polyester resin which comprises the esterification product of ethylene glycol, diethylene glycol, maleic anhydride and the Diels-Alder reaction product of hexachlorocyclopentadiene and maleic anhydride and (B) a compound having the formula:

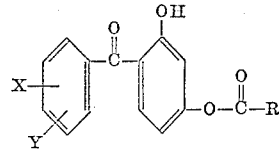

wherein R represents an unsaturated radical and wherein X and Y are each substituents selected from the group consisting of hydrogen, alkyl, halogen, hydroxyl and alkoxyl provided that hydroxyl and alkoxyl substituents can only occur in the 2,4 and 6 positions.

5. A composition according to claim 4 when polymerized with styrene.

6. A composition of matter comprising (A) an unsaturated polyester resin which comprises the esterification product of ethylene glycol, diethylene glycol, maleic anhydride and the Diels-Alder reaction product of hexachlorocyclopentadiene and maleic anhydride, and (B) 2-hydroxy-4-methacryloxy-benzophenone.

References Cited in the file of this patent

UNITED STATES PATENTS

| | | |
|---|---|---|
| 1,951,782 | Bauer et al. | Mar. 20, 1934 |
| 2,853,521 | Hardy | Sept. 23, 1958 |
| 2,890,193 | Hardy | June 9, 1959 |
| 2,938,883 | Raich | May 31, 1960 |
| 2,962,533 | Hardy et al. | Nov. 29, 1960 |
| 2,980,647 | Lappin | Apr. 18, 1961 |
| 3,080,340 | Havens et al. | Mar. 5, 1963 |

FOREIGN PATENTS

| | | |
|---|---|---|
| 470,397 | Great Britain | Aug. 10, 1937 |